J. V. ROBINSON.
AUTOMATIC TRAIN PIPE CONNECTOR.
APPLICATION FILED MAR. 11, 1914. RENEWED SEPT. 13, 1917.
1,245,788.
Patented Nov. 6, 1917.
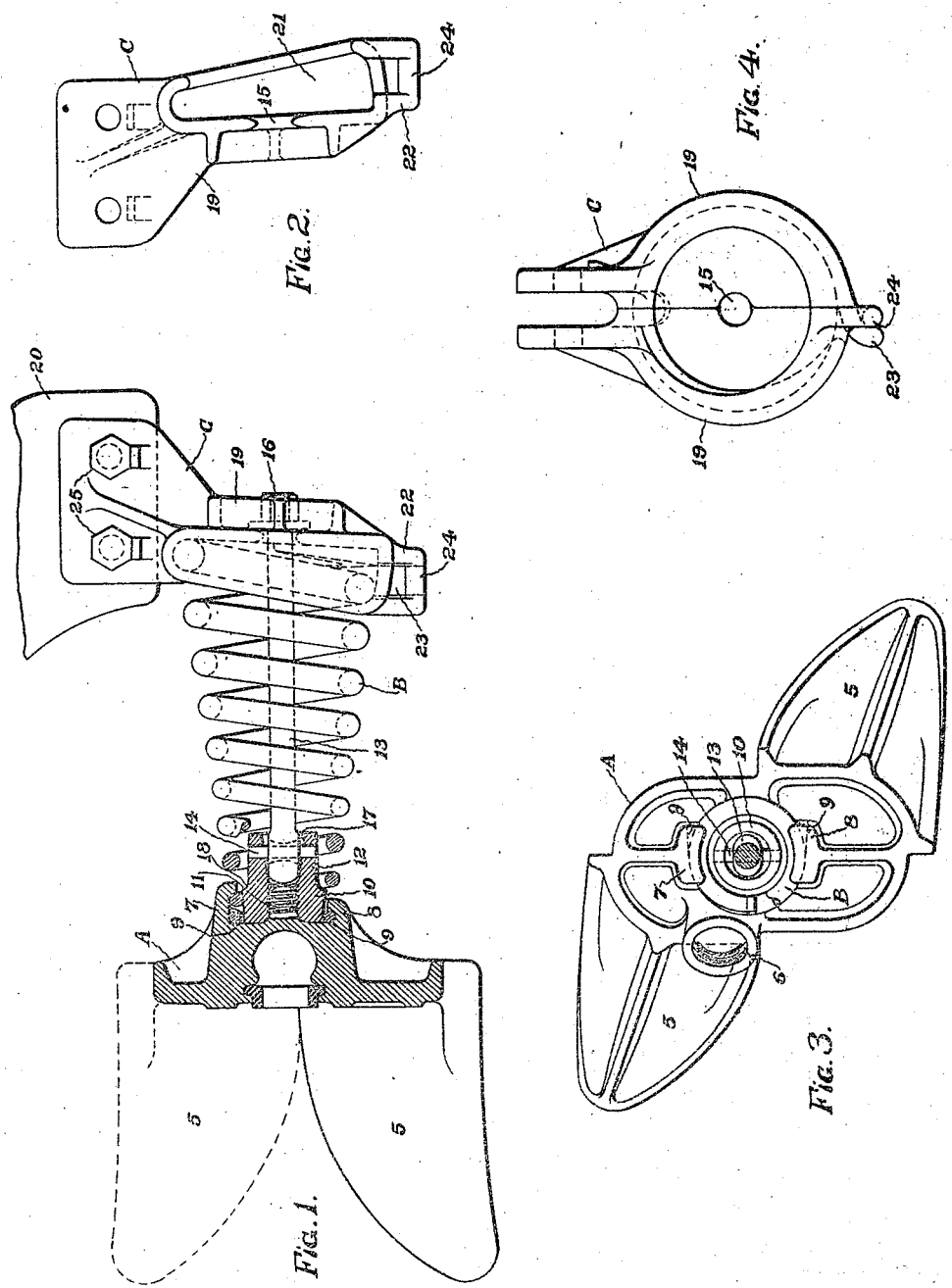

UNITED STATES PATENT OFFICE.

JOSEPH V. ROBINSON, OF BRANFORD, CONNECTICUT.

AUTOMATIC TRAIN-PIPE CONNECTOR.

1,245,788.  Specification of Letters Patent.  Patented Nov. 6, 1917.

Application filed March 11, 1914, Serial No. 823,971. Renewed September 13, 1917. Serial No. 191,309.

*To all whom it may concern:*

Be it known that I, JOSEPH V. ROBINSON, a citizen of the United States, and resident of Branford, county of New Haven, State of Connecticut, have invented certain new and useful Improvements in Automatic Train-Pipe Connectors, of which the following is a specification.

The present invention relates to improvements in automatic train pipe connectors and has for its object to provide an improved support for the connector head which will permit shifting of the head in planes parallel to its face and thereby eliminate leaks by minimizing the cause of coupled connector heads opening up or rocking one upon the other in rounding curves, etc., in service.

The invention consists in the combination, arrangements and constructions hereinafter described, pointed out in the appended claims and illustrated in the accompanying drawings, in which:

Figure 1 is a side elevation of my improved support showing some of the parts in section.

Fig. 2 is an interior view of one of the base members.

Fig. 3 is a rear view of the connector head showing the method of locking the supporting spring thereto, and Fig. 4 is a front face view of the base.

Any suitable type of coupling head A may be used with my improved support and any desired form of guiding prongs 5 for alining mating heads on curves, etc., may be employed. I show a connector head of oval outline, as viewed from the front, and having the guiding prongs 5 spaced diagonally upon its face, and having also a laterally extending fluid conduit 6. Upon the rear face of the head and at the rear of said conduit I provide diametrically disposed portions 7 and 8 having on their inner face a transverse recess or seat 9. Beneath these portions and in said recess or seat, I mount the apex end of a conical spiral supporting spring B, which spring is coiled of a gradually tapering bar and constitutes the sole means of supporting the coupling head A. The spring resists movement of the head with a varying force increasing in greater progression than the extent of such movement and is locked in said seat by a plug or member 10 threadingly connected to a projection 11 which is integral with the head and extends axially thereof within the coils of the apex of the supporting spring B. The plug is provided with a recessed head 12 within which a stem 13 is flexibly or movably secured by a pin 14. The stem extends rearwardly through the spring B and through an opening 15 in the base C and is provided with a hexagon head 16 for engaging the rear face of the base to prevent excessive forward movement of the head relative to the base and for receiving a wrench to apply and remove the plug 10. Abrupt bending and injurious localization of strains in the spring B is prevented by engagement of the walls 17 of the plug with the stem 12 which transmits such strains to the stem and frees the spring thereof. A tapered shoulder 18 is provided on the plug for expanding the coils of the apex end of the spring into rigid engagement with the portions 6, 7 and 8.

A base C comprising independent members or halves 19 is provided for supporting the automatic connector from a suitable lug 20 of the car. Each of the halves 19 is provided on its inner face with a semicircumferential recess or seat 21 for receiving the base coil of the supporting spring B. Any suitable means for clamping the members of the base together about said spring and to the lug 20, may be employed. To secure together the lower extremities of the members, I provide one of such members with a perforated ear 22 and the other with a curved finger or projection 23 which extends into the perforation of said ear and embraces a portion of the wall 24 thereof. The upper extremities of the base members are secured together and to the lug 20 by bolts 25, as shown.

This provides a highly advantageous construction of base in which the base coil of the supporting spring B may be rigidly clamped with the minimum number of parts. The grip of the members 19 upon the base of the spring prevents rotary movement of the latter relative to the base, while the head is held against rotary movement relative to the spring by expanding the apex coils of the latter in the manner previously described.

This construction produces an improved connector having a strong and compact support which permits shifting of the head in planes parallel to its face, to accommodate the rapid vibrations and whipping movement imparted to coupled heads in service.

Thus injurious battering action of connector heads in coupling and the strains tending to open the heads in rounding curves, etc., I have greatly abated by a simple and effective construction.

Having thus described my invention, what I claim as new and desire to secure by United States Letters Patent is:

1. In an automatic train pipe connector, the combination of a connector head provided on its rear face with a seat for one end of a coiled spring, a base, a coiled spring having one end attached to the base and its other end fitted within said seat in the connector head, and means for securing the spring in engagement with the head adapted to be operated from adjacent the base end of the spring.

2. In an automatic train pipe connector, the combination of a connector head provided on its rear face with a seat for one end of a coiled spring, and having centrally arranged within said seat an exteriorly threaded stud, a base, a coiled spring having one end attached to the base and its other end extending into said seat in the connector head, and a member engaging the threaded stud within said seat and adapted to secure the spring to the head.

3. In an automatic train pipe connector, the combination of a base, a conical spiral spring having its larger end attached to the base, a head having a seat receiving the smaller end of the spring, and means operable from in rear of the base for securing the head and spring together.

4. In an automatic train pipe connector, the combination of a connector head, a base, a spring interposed between the base and head for supporting the head for shifting in planes parallel to its face, and a stem loosely connected with said head and extending through said spring and base.

5. In an automatic train pipe connector, the combination of a connector head having a laterally extending fluid conduit, a yieldable support for supporting said head for shifting in planes parallel to its face, means at the rear of said conduit for connecting said support with said head, a base, and a stem movably connected with the head and extending axially of said spring through said base.

6. In an automatic train pipe connector, the combination of a connector head, a yieldable support for the head, a seat for said support at the rear of said head, a base, and a stem flexibly connected with said head and extending past said base whereby said head may shift in planes parallel to its face.

7. In an automatic train pipe connector, the combination of a connector head, a laterally extending fluid conduit connected with the head, portions at the rear of said conduit provided with a transverse recess, a spring having one end mounted in said recess, a plug for locking the spring in the recess, a base, and a stem connected with said plug and extending past said base, said stem being provided with a head for receiving means to remove and replace said plug.

8. In an automatic train pipe connector, the combination of a connector head, a support for the head, and a base for supporting the connector from the car, said base comprising members one of which is provided with a perforated ear and the other of which is provided with a projection adapted to enter the perforation of said ear to lock the members together, both of said members being provided on their inner face with a semi-circumferential recess for receiving said spring.

In testimony whereof I have hereunto set my hand in the presence of two witnesses.

JOSEPH V. ROBINSON.

Witnesses:
ARTHUR L. BRYANT,
S. C. McBRIDE.